United States Patent
Wang et al.

(10) Patent No.: US 8,938,012 B2
(45) Date of Patent: Jan. 20, 2015

(54) VIDEO CODER

(75) Inventors: Ye-Kui Wang, Bridgewater, NJ (US); Miska Matias Hannuksela, Ruutana (FI)

(73) Assignee: Nokia Corporation, Espoo (FI)

(*) Notice: Subject to any disclaimer, the term of this patent is extended or adjusted under 35 U.S.C. 154(b) by 1005 days.

(21) Appl. No.: 12/595,765

(22) PCT Filed: Apr. 13, 2007

(86) PCT No.: PCT/IB2007/002344
§ 371 (c)(1),
(2), (4) Date: Jul. 29, 2010

(87) PCT Pub. No.: WO2008/125900
PCT Pub. Date: Oct. 23, 2008

(65) Prior Publication Data
US 2011/0002397 A1  Jan. 6, 2011

(51) Int. Cl.
H04N 7/26 (2006.01)
H04N 19/30 (2014.01)
H04N 19/70 (2014.01)
H04N 19/423 (2014.01)

(52) U.S. Cl.
CPC ... *H04N 19/00884* (2013.01); *H04N 19/00424* (2013.01); *H04N 19/00484* (2013.01)
USPC .................................................. 375/240.26

(58) Field of Classification Search
None
See application file for complete search history.

(56) References Cited

U.S. PATENT DOCUMENTS

| | | | |
|---|---|---|---|
| 2004/0179619 A1* | 9/2004 | Tian et al. | 375/240.26 |
| 2006/0233242 A1* | 10/2006 | Wang et al. | 375/240.08 |
| 2006/0239563 A1* | 10/2006 | Chebil et al. | 382/232 |
| 2006/0256851 A1* | 11/2006 | Wang et al. | 375/240.01 |
| 2007/0014346 A1 | 1/2007 | Wang et al. | |
| 2007/0030893 A1* | 2/2007 | Chen | 375/240.1 |

FOREIGN PATENT DOCUMENTS

WO  2006108917 A1  10/2006

OTHER PUBLICATIONS

Office Action received in corresponding Chinese Application No. 200780053133.3, Dated Feb. 23, 2012, 8 pages.
Office Action received from Chinese Patent Application No. 200780053133.3, dated May 25, 2011, 23 pages.
Office Action received from European Patent Application No. 07789636.3, dated Mar. 18, 2010, 3 pages.
Office Action from Korean Patent Application No. 10-2009-7023664, dated Mar. 18, 2011, 7 pages.
International Search Report and Written Opinion of the International Searching Authority from PCT Application No. PCT/IB2007/002344, dated Mar. 3, 2008, 7 pages.
Wiegand et al., "Joint Draft 9 of SVC Amendment" Joint Video Team (JVT) of ISO/IEC MPEG & ITU-T VVEG (ISO/IEC JTC1/SC29/WG11 and ITUT SG16 Q6) Jan. 13, 2007.

(Continued)

*Primary Examiner* — Sath V Perungavoor
*Assistant Examiner* — Kate Luo
(74) *Attorney, Agent, or Firm* — Alston & Bird LLP

(57) ABSTRACT

An encoder for encoding a video signal, wherein the encoder is configured to generate an encoded scalable data stream comprising a base layer and at least one enhancement layer, wherein the encoder is further configured to generate information associated with each of the base layer and the at least one enhancement layer.

26 Claims, 5 Drawing Sheets

(56) References Cited

OTHER PUBLICATIONS

JVT-V209, "Joint Draft 2.0 on Multiview Video Coding", 22nd JVT meeting, Marrakech, Morocco, Jan. 2007, available from http://ftp3.itu.ch/av-arch/jvt-site/2007_01_Marrakech/JVT-V209.zip.

Schwarz, "Hierarchical B pictures", Joint Video Team (JVT) of ISO/IEC MPEG & ITU-T VCEG (ISO/IEC JTC1/SC29/WG11 and ITU-T SG16 Q.6) 16th Meeting: Poznan, PL, Jul. 23-29, 2005.

Wang et al., "SVC Hypothetical Reference Decoder (HRD)" Joint Video Team (JVT) of ISO/IEC MPEG & ITU-T VCEG (ISO/IEC JTC1/SC29/WG11 and ITU-T SG16Q.6) 21st Meeting, Hangzou, China, Document, JVT-U111, Oct. 20, 2006.

Office Action received in corresponding Australian Application No. 2007350974, Dated Jan. 23, 2012, 2 pages.

Wiegand et al., "Joint Draft 9 of SVC Amendment" Joint Video Team (JVT) of ISO/IEC MPEG & ITU-T VCEG (ISO/IEC JTC1/SC29/WG11 and ITUT SG16 Q6) Jan. 13, 2007.

Office Action for Chinese Application No. 200780053133.3 dated Sep. 28, 2012.

H. Schwarz, D. Marpe, and T. Wiegand, "Subband Extension of H.263/AVC," Joint Video Team, Doc. JVT-K023, Munich, Germany, Mar. 2004.

K.-P. Lim, G. J. Sullivan, and T. Wiegand, "Text Description of Joint Model Reference Encoding Methods and Decoding Concealment Methods," Joint Video Team, Doc. JVT-L046, Redmond, WA, USA, Jul. 2004.

G. H. Park, M. W. Park, S. Jeong, K. K. Kim, and J. Hong, "Improve SVC Coding Efficiency be Adaptive GOP Structure," Joint Video Team, Doc. JVT-O018, Busan, Korea, Apr. 2005.

J. Reichel, H. Schwarz, and M. Wein, "Joint Scalable Video Model JSVM 1," Joint Video Team Doc. JVT-N023, Hong Kong, China, Jan. 2005.

M. Flierl, T. Weigand, and B. Girod, "A Locally Optimal Design Algorithm for Block-Based Multi-Hypothesis Motion-Compensated Prediction," Proceedings of the Data Compression Conference, Snowbird, USA, Apr. 1998.

A. M. Tourpais, K. Sühring, and G. J. Sullivan, "H.264/MPEG4-AVC Reference Software Manual," Joint Video Team, Doc. JVT-N008, Hong Kong, China, Jan. 2005.

K. Ramchandran, A. Ortega, and M. Vetterli, "Bit Allocation for Dependant Quantization with Applications to Multiresoultion and MPEG Video Coders," IEEE Transactions on Image Processing, vol. 3, pp. 533-545, Sep. 1994.

International Preliminary Report on Patentability for International Application No. PCT/IB2007/002344 dated Oct. 1, 2009.

\* cited by examiner

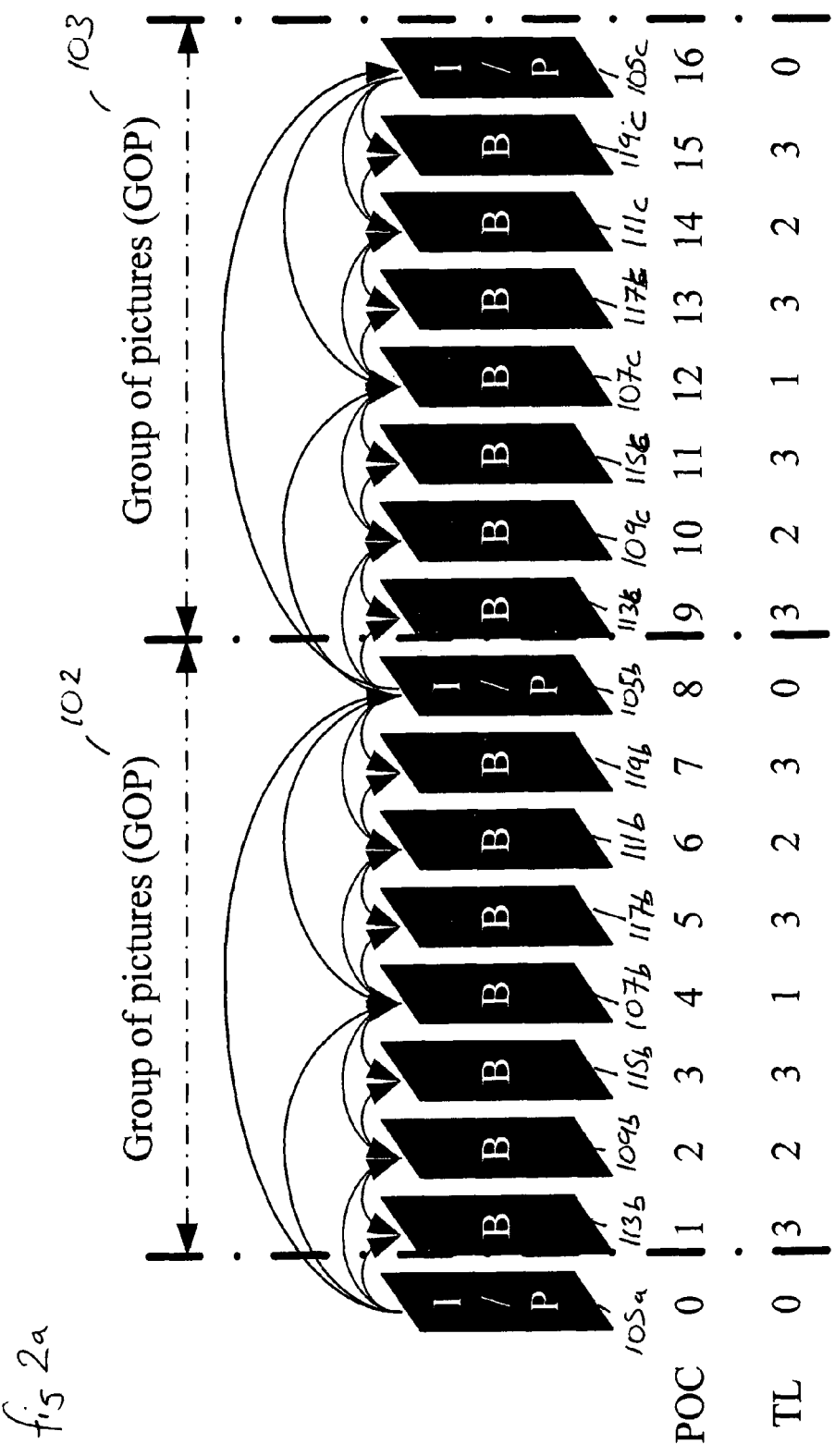

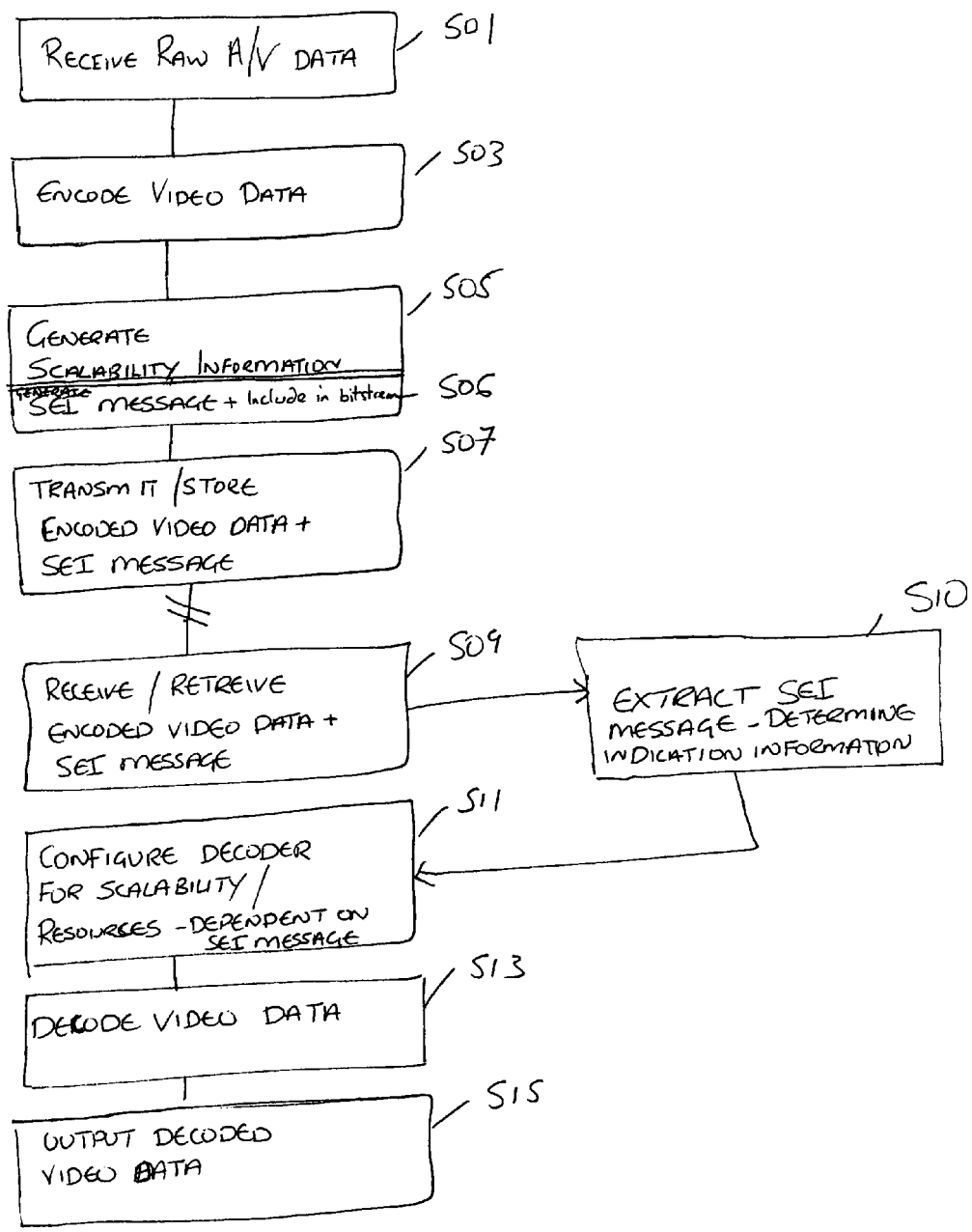

VIDEO CODER

RELATED APPLICATIONS

This application was originally filed as PCT Application No. PCT/IB2007/002344 filed Apr. 13, 2007.

FIELD OF THE INVENTION

The present invention relates to video coding, and in particular, but not exclusively to scalable video coding.

BACKGROUND OF THE INVENTION

Video signals are coded for example to enable an efficient transmission or storage of the video signals. These codes are grouped into defined standards defining how to encode and decode such video signals.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 Advanced Video Coding (AVC) standard). There are currently efforts underway with regards to the development of further video coding standards. One such further standard under development is the scalable video coding (SVC) standard. Another further standard under development is the multi-view video coding (MVC). Both the SVC and MVC standards are intended to add features to the H.264/AVC standard described above.

The latest draft of SVC, the Joint Draft 9.0, is available in JVT-V201, "Joint Draft 9 of SVC Amendment", 22nd JVT meeting, Marrakech, Morocco, January 2007, available from http://ftp3.1tu.ch/av-arch/jvt-site/2007_01_Marrakech/JVT-V201.zip.

The latest joint draft of MVC is available in JVT-V209, "Joint Draft 2.0 on Multiview Video Coding", 22nd JVT meeting, Marrakech, Morocco, January 2007, available from http://ftp3.1tu.ch/av-arch/jvt-site/2007_01_Marrakech/JVT-V209.zip.

Video coders/decoders are also known as codecs. In scalable codecs some elements or element groups of the video sequence can be removed without affecting the reconstruction of other parts of the video sequence. Scalable video coding is a desirable feature for many multimedia applications and services used in systems employing decoders with a wide range of processing power. Scalable bit streams may be used for example for rate adaptation of pre-coded unicast streams in a streaming server and for transmission of a single bit stream to terminals having different decoding or display capabilities and/or with different network conditions.

The earliest scalability introduced to video coding standards was temporal scalability with B pictures in MPEG-1 Visual. In the B picture concept, a B picture is bi-predicted from two pictures, one picture preceding the B picture and the other picture succeeding the B picture, both in display order. In addition, a B picture is a non-reference picture, i.e. it is not used for inter-picture prediction reference by other pictures. Consequently, the B pictures may be discarded to achieve temporal scalability with a lower frame rate. The same mechanism was retained in MPEG-2 Video, H.263 and MPEG-4 Visual.

In H.264/AVC, the concept of B pictures or B slices has been changed. The definition of B slice in H.264/AVC is a slice that may be decoded using inter prediction from previously-decoded reference pictures with at most two motion vectors and reference indices to predict the sample values of each block. In H.264/AVC the bi-directional prediction property and the non-reference picture property of the conventional B picture concept of the previous coding standards are no longer valid.

A block in a B slice may be predicted from two reference pictures in the same direction in display order, and a picture consisting of B slices may be referred by other pictures for inter-picture prediction.

In H.264/AVC and its extensions SVC and MVC, temporal scalability may be achieved by using non-reference pictures and/or hierarchical inter-picture prediction structure. Using only non-reference pictures the H.264/AVC, SVC and MVC coding standards are able to achieve similar temporal scalability as using conventional B pictures in MPEG-1/2/4, by discarding non-reference pictures. Hierarchical coding structure can achieve more flexible temporal scalability.

Scalability may be typically implemented by grouping the image frames into a number of hierarchical layers. The image frames coded into the image frames of the base layer comprise only the ones that are compulsory for the decoding of the video information at the receiving end. One or more enhancement layers may be determined above the base layer, each one of the layers improving the quality of the decoded video in comparison with a lower layer. However a meaningful decoded representation can be produced only by decoding certain parts of a scalable bit stream.

In H.264/AVC and other similar coding schemes, decoded pictures used for predicting subsequent coded pictures and for future output are buffered in the decoded picture buffer (DPB). To efficiently utilize the buffer memory, the DPB management processes, including the storage process of decoded pictures into the DPB, the marking process of reference pictures, output and removal processes of decoded pictures from the DPB, may be specified.

The reference picture management process in H.264/AVC may be summarized as follows. The maximum number of reference pictures used for inter prediction, referred to as M, may be indicated in the active sequence parameter set. Thus when a reference picture is decoded, it may be marked as "used for reference". If the decoding of the reference picture caused more than M pictures marked as "used for reference", at least one picture must be marked as "unused for reference". The DPB removal process may then remove pictures marked as "unused for reference" from the DPB if they are not needed for output as well. Each short-term picture may be associated with a variable PicNum that is derived from the syntax element frame_num, and each long-term picture may be associated with a variable LongTermPicNum that is derived form the long_term_frame_idx which is signaled by a memory management control operation (MMCO) command.

There may be two types of operation for reference picture marking: adaptive memory control and sliding window. The operation mode for reference picture marking may be selected on picture basis.

The adaptive memory control method requires the presence of memory management control operation (MMCO) commands in the bitstream. The memory management control operations enable explicit signalling to indicate which pictures are marked as "unused for reference", assigning long-term indices to short-term reference pictures, storage of the current picture as long-term picture, changing a short-term picture to the long-term picture, and assigning the maximum allowed long-term index for long-term pictures.

The sliding window control method uses a sliding window to store only the latest M pictures marked as "used for reference". Thus any earlier short-term reference picture that were decoded among the short-term reference pictures that are marked as "used for reference" is then marked as "unused for reference" when the picture is not within the window. In other words, the sliding window operation mode results into first-in-first-out buffering operation among short-term reference pictures.

The hypothetical reference decoder (HRD), specified in Annex C of H.264/AVC, is used to check bitstream and decoder conformances. The HRD contains a coded picture buffer (CPB), an instantaneous decoding process, a decoded picture buffer (DPB), and an output picture cropping block. The CPB and the instantaneous decoding process are specified similarly to any other video coding standard, and the output picture cropping block simply crops those samples from the decoded picture that are outside the signaled output picture extents. The DPB was introduced in H.264/AVC in order to control the required memory resources for decoding of conformant bitstreams. The DPB includes a unified decoded picture buffering process for reference pictures and output reordering. A decoded picture is removed from the DPB when it is no longer used as reference and no longer needed for output. The maximum size of the DPB that bitstreams are allowed to use is specified in the Level definitions (Annex A) of H.264/AVC.

There are two types of conformance for decoders: output timing conformance and output order conformance. For output timing conformance, a decoder must output pictures at identical times compared to the HRD. For output order conformance, only the correct order of output picture is taken into account. The output order DPB is assumed to contain a maximum allowed number of frame buffers. A frame is removed from the DPB when it is no longer used as reference and needed for output. When the DPB becomes full, the earliest frame in output order is output until at least one frame buffer becomes unoccupied.

These memory control methods however are problematic when some highest temporal layers are discarded. The reduction of the highest temporal layers creates gaps in frame_num in the bitstream. Where this occurs, the decoding process generates short-term "non-existing" pictures having the missing frame_num values. Such "non-existing" pictures are handled in the same way as normal short-term reference pictures in the sliding window reference picture marking process.

The amount of memory buffer required for decoding a subset of a temporal scalable bitstream may be less than that for decoding the temporal scalable bitstream itself, however the coding schemes mentioned above in order to be certain of being able to decode any encoded bitstream will define memory and buffer spacing for the temporal scalable bitstream in total.

For example, in the H.264/AVC standard, the required decoded picture buffer (DPB) size for decoding the entire bitstream is specified by the syntax element max_dec_frame_buffering. Consequently, the decoder able to handle the decoding of a subset of a temporal scalable bitstream has to be equipped with extra memory buffer.

Furthermore even if the decoder is equipped with the buffering memory resources for the entire temporal scalable bitstream, it would be desirable that it could allocate exactly the amount of memory that is required for decoding the desired subset of the entire bitstream and use the saved memory resources for other applications.

There is another similar problem. The maximum number of frames reordered for output is also typically signalled for the entire bitstream. For example in the H.264/AVC standard the syntax element num_reorder_frames is used to set the maximum reordered frames for output. However a subset of the bitstream may require fewer frames reordered for output. For example a subset bitstream comprising only key pictures (defined later), the maximum number of frames reordered for output is actually zero as the output order is identical to the output order. In such a system the decoder that decodes a subset of a temporal scalable bitstream would wait for extra pictures to be decoded to start output, which would cause an initial playback delay over the possible playback delay for the subset of the temporal scalable bitstream.

SUMMARY OF THE INVENTION

This invention proceeds from the consideration that the decoded picture buffer management is not optimally performed where scalable video coding is implemented. Exploiting information passed from the encoder to the decoder about different temporal scalable layers of the scalable video can result in a more efficient memory buffer consumption for decoding subsets of a temporal scalable bitstream.

Embodiments of the present invention aim to address the above problem.

There is provided according to a first aspect of the invention an encoder for encoding a video signal, wherein the encoder is configured to generate an encoded scalable data stream comprising a base layer and at least one enhancement layer, wherein the encoder is further configured to generate information associated with each of the base layer and the at least one enhancement layer.

The information may comprise at least one of: a minimum picture buffer size associated with each of the base layer and the at least one enhancement layer; and a maximum picture reordering size associated with each of the base layer and the at least one enhancement layer.

The encoder may comprise: a scalable encoder configured to generate the encoded scalable data stream, and a message former configured to generate the information associated with each of the base layer and the at least one enhancement layer and store the information in a message.

The message former may further be configured to combine the message within the encoded scalable data stream.

The message former may be configured to generate a Supplemental Enhancement Information message.

The Supplemental Enhancement Information message may further comprise an indication of the number of temporal scalable layers contained in the encoded scalable data stream.

The message former may be configured to generate a container file, wherein the container file comprises the information associated with each of the base layer and the at least one enhancement layer in a message.

The encoder may be configured to generate a signalling protocol packet comprising the information associated with each of the base layer and the at least one enhancement layer.

The signalling protocol is preferably at least one of: Session Initiation Protocol; and Real-Time Streaming Protocol.

The packet is preferably a session description protocol packet, and the information associated with each of the base layer and the at least one enhancement layer are preferably session description protocol packet attributes.

According to a second aspect of the present invention there is provided a method for encoding a video signal comprising: generating an encoded scalable data stream comprising a base layer and at least one enhancement layer; and generating information associated with each of the base layer and the at least one enhancement layer.

Generating information may comprise generating at least one of: a minimum picture buffer size associated with each of the base layer and the at least one enhancement layer; and a maximum picture reordering size associated with each of the base layer and the at least one enhancement layer.

The method may further comprise storing the information associated with each of the base layer and the at least one enhancement layer in a message.

The method may further comprise combining the message within the encoded scalable data stream.

The method may comprise generating a Supplemental Enhancement Information message.

The method may comprise storing an indication of the number of temporal scalable layers contained in the encoded scalable data stream in the Supplemental Enhancement Information message.

The method may comprise generating a container file, wherein the container file may comprise the information associated with each of the base layer and the at least one enhancement layer in a message.

The method may comprise generating a signalling protocol packet comprising the information associated with each of the base layer and the at least one enhancement layer.

Generating the signalling protocol packet may comprise generating at least one of: Session Initiation Protocol packet; and Real-Time Streaming Protocol packet.

Generating the signalling protocol packet may comprise generating a session description protocol packet, and generating session description protocol packet attributes comprising the information associated with each of the base layer and the at least one enhancement layer.

According to a third aspect of the present invention there is provided a decoder for decoding an encoded scalable data stream, wherein the decoder is configured to receive an encoded scalable data stream comprising a base layer and at least one enhancement layer signal, and output a decoded video signal, wherein the decoder is further configured to: receive information associated with each of the base layer and the at least one enhancement layer; configure the decoder dependent on the information associated with each of the base layer and the at least one enhancement layer; decode the encoded scalable data stream dependent on the configuration of the decoder.

The information may comprise at least one of: a minimum picture buffer size associated with each of the base layer and the at least one enhancement layer; and a maximum picture reordering size associated with each of the base layer and the at least one enhancement layer.

The decoder may comprise: a message deformer configured to extract the information associated with each of the base layer and the at least one enhancement layer from a message in the encoded data stream; and a configurable scalable decoder configured to generate the decoded video data from the scalable data stream, wherein the message deformer is preferably further configured to configure the configurable scalable decoder dependent on the information associated with each of the base layer and the at least one enhancement layer.

The message deformer is preferably further configured to filter the information message from the encoded scalable data stream.

The message deformer is preferably configured to extract the information associated with each of the base layer and the at least one enhancement layer from a Supplemental Enhancement Information message.

The message deformer is preferably configured to extract an indication of the number of temporal scalable layers contained in the encoded scalable data stream from the Supplemental Enhancement Information message.

The message deformer is preferably configured to extract the information associated with each of the base layer and the at least one enhancement layer from a container file.

The decoder is preferably configured to extract the information associated with each of the base layer and the at least one enhancement layer from a signalling protocol packet.

The decoder is preferably configured to extract the information associated with each of the base layer and the at least one enhancement layer from a signalling protocol packet comprising at least one of: Session Initiation Protocol; and Real-Time Streaming Protocol.

The decoder is preferably configured to extract the information associated with each of the base layer and the at least one enhancement layer from a session description protocol packet, wherein the information associated with each of the base layer and the at least one enhancement layer are preferably session description protocol packet attributes.

According to a fourth aspect of the present invention there is provided a method for decoding a video signal comprising: receiving an encoded scalable data stream comprising a base layer and at least one enhancement layer signal; receiving information associated with each of the base layer and the at least one enhancement layer; configuring the decoder dependent on the information associated with each of the base layer and the at least one enhancement layer; decoding the encoded scalable data stream dependent on the configuration of the decoder; and outputting a decoded video signal.

The information may comprise at least one of: a minimum picture buffer size associated with each of the base layer and the at least one enhancement layer; and a maximum picture reordering size associated with each of the base layer and the at least one enhancement layer.

The method may comprise: extracting the information associated with each of the base layer and the at least one enhancement layer from a message in the encoded data stream; and wherein configuring the decoder may comprise configuring the decoder dependent on the extracted information.

The method may be further configured to filter the information message from the encoded scalable data stream.

Extracting the information may comprise extracting the information associated with each of the base layer and the at least one enhancement layer from a Supplemental Enhancement Information message.

Extracting may further comprise extracting an indication of the number of temporal scalable layers contained in the encoded scalable data stream from the Supplemental Enhancement Information message.

Extracting may further comprise extracting the information associated with each of the base layer and the at least one enhancement layer from a container file.

Extracting may further comprise extracting the information associated with each of the base layer and the at least one enhancement layer from a signalling protocol packet.

Extracting may further comprise extracting the information associated with each of the base layer and the at least one enhancement layer from a signalling protocol packet comprising at least one of: Session Initiation Protocol; and Real-Time Streaming Protocol.

Extracting may further comprise extracting the information associated with each of the base layer and the at least one enhancement layer from a session description protocol packet, wherein the information associated with each of the base layer and the at least one enhancement layer are session description protocol packet attributes.

According to a fifth aspect of the invention there is provided an apparatus comprising an encoder as described above.

According to a sixth aspect of the invention there is provided an apparatus comprising a decoder as described above.

According to a seventh aspect of the invention there is provided an electronic device comprising an encoder as described above.

According to an eighth aspect of the invention there is provided an electronic device comprising a decoder as described above.

According to a ninth aspect of the invention there is provided a computer program product configured to perform a method for encoding a video signal comprising: generating an encoded scalable data stream comprising a base layer and at least one enhancement layer; and generating information associated with each of the base layer and the at least one enhancement layer.

According to a tenth aspect of the invention there is provided a computer program product configured to perform a method for decoding a video signal comprising: receiving an encoded scalable data stream comprising a base layer and at least one enhancement layer signal; receiving information associated with each of the base layer and the at least one enhancement layer; configuring the decoder dependent on the information associated with the base layer and the at least one enhancement layer; decoding the encoded scalable data stream dependent on the configuration of the decoder; and outputting a decoded video signal.

According to an eleventh aspect of the invention there is provided an encoder for encoding a video signal, comprising: means for generating an encoded scalable data stream comprising a base layer and at least one enhancement layer, and means for generating information associated with each of the base layer and the at least one enhancement layer.

According to a twelfth aspect of the invention there is provided a decoder for decoding an encoded scalable data stream, wherein the decoder comprises: means for receiving an encoded scalable data stream comprising a base layer and at least one enhancement layer signal; means for receiving information associated with each of the base layer and the at least one enhancement layer; means for configuring the decoder dependent on the information associated with each of the base layer and the at least one enhancement layer; means for decoding the encoded scalable data stream dependent on the configuration of the decoder; and means for outputting a decoded video signal.

BRIEF DESCRIPTION OF DRAWINGS

For better understanding of the present invention, reference will now be made by way of example to the accompanying drawings in which:

FIG. 2a shows schematically a hierarchical structure of four temporal scalable layers of video pictures as employed in embodiments of the present invention;

FIG. 4 shows a flow diagram illustrating the operation of the encoder and decoder of FIGS. 3a and 3b according to a first embodiment of the present invention.

DESCRIPTION OF PREFERRED EMBODIMENTS OF THE INVENTION

Figure 1:
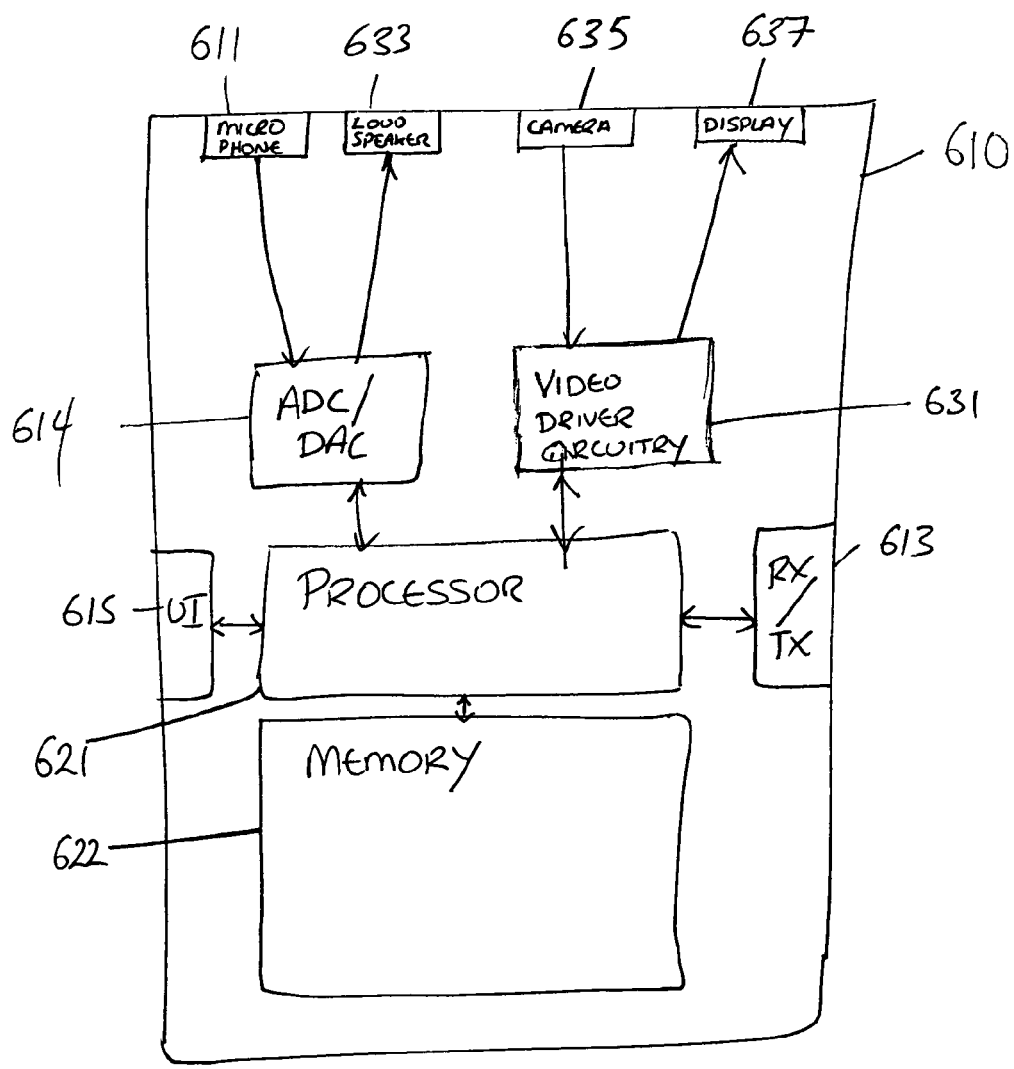
FIG. 1 shows schematically an electronic device employing embodiments of the invention.

The following describes in more detail possible video codec mechanisms for the provision of layered or scalable video codecs. In this regard reference is first made to FIG. 1 which shows a schematic block diagram of an exemplary electronic device 610, which may incorporate a codec according to embodiments of the invention.

The electronic device 610 may for example be a mobile terminal or user equipment of a wireless communication system.

The electronic device 610 comprises a microphone 611, which is linked via an analogue-to-digital/digital-to-analogue converter (ADC/DAC) 614 to a processor 621. The processor 621 is further linked via the ADC/DAC 614 to loudspeakers 633. The processor 621 is further linked to a transceiver (TX/RX) 613, to a user interface (UI) 615 and to a memory 622.

The processor 621 is further linked to video driver circuitry 631 which in turn is connected to a camera 635 and a display 637.

The processor 621 may be configured to execute various program codes. The implemented program codes comprise video encoding code for encoding. The implemented program codes 623 further comprise video decoding code. The implemented program codes 623 may be stored for example in the memory 622 for retrieval by the processor 621 whenever needed. The memory 622 could further provide a section for storing data, for example data that has been encoded in accordance with the invention.

The encoding and decoding code may in embodiments of the invention be implemented in hardware or firmware.

The user interface 615 enables a user to input commands to the electronic device 610, for example via a keypad, and/or to obtain information from the electronic device 610, for example via a display 637. The transceiver 613 enables communication with other electronic devices, for example via a wireless communication network.

The video driver circuitry 631 receives data from the processor 621 and outputs the data in a form to be displayed on the display 637. Furthermore the video driver circuitry is configured to receive video data from the camera 635 and output the data to the processor 621 in a form suitable to be processed.

It is to be understood again that the structure of the electronic device 610 could be supplemented and varied in many ways.

A user of the electronic device 610 may use the camera 635 for inputting video that is to be transmitted to some other electronic device or that is to be stored in the data section of the memory 622. A corresponding application has been activated to this end by the user via the user interface 615. This application, which may be run by the processor 621, which causes the processor 621 to execute the encoding code stored in the memory 622.

The processor 621 may then process the video signal in the way as described with reference the embodiments of the present invention.

The resulting bit stream may be provided to the transceiver 613 for transmission to another electronic device. Alternatively, the coded data could be stored in the data section of the memory 622, for instance for a later transmission or for a later presentation by the same electronic device 610.

The electronic device 610 could also receive a bit stream with correspondingly encoded data from another electronic device via the transceiver 613. In this case, the processor 621 may execute the decoding program code stored in the memory 622. The processor 621 decodes the received data, as described with reference to the embodiments of the invention described hereafter, and provides the decoded data to the video driver circuitry 631. The video driver circuitry 631 converts the digital decoded data into the formal suitable for the display 637 and outputs the data to the display 637. Execution of the decoding program code could be triggered as well by an application that has been called by the user via the user interface 615.

The received encoded data could also be stored instead of an immediate presentation via the display 637 in the data section of the memory 622, for instance for enabling a later presentation or a forwarding to still another electronic device.

It would be appreciated that the FIGS. 2a, 2b, 3a, 3b, and 4 represent only a part of the operation of a complete video codec as exemplarily shown implemented in the electronic device shown in FIG. 1. The general operation of video codecs are known and features of such codecs which do not assist in the understanding of the operation of the invention are not described in detail.

Figure 2B:
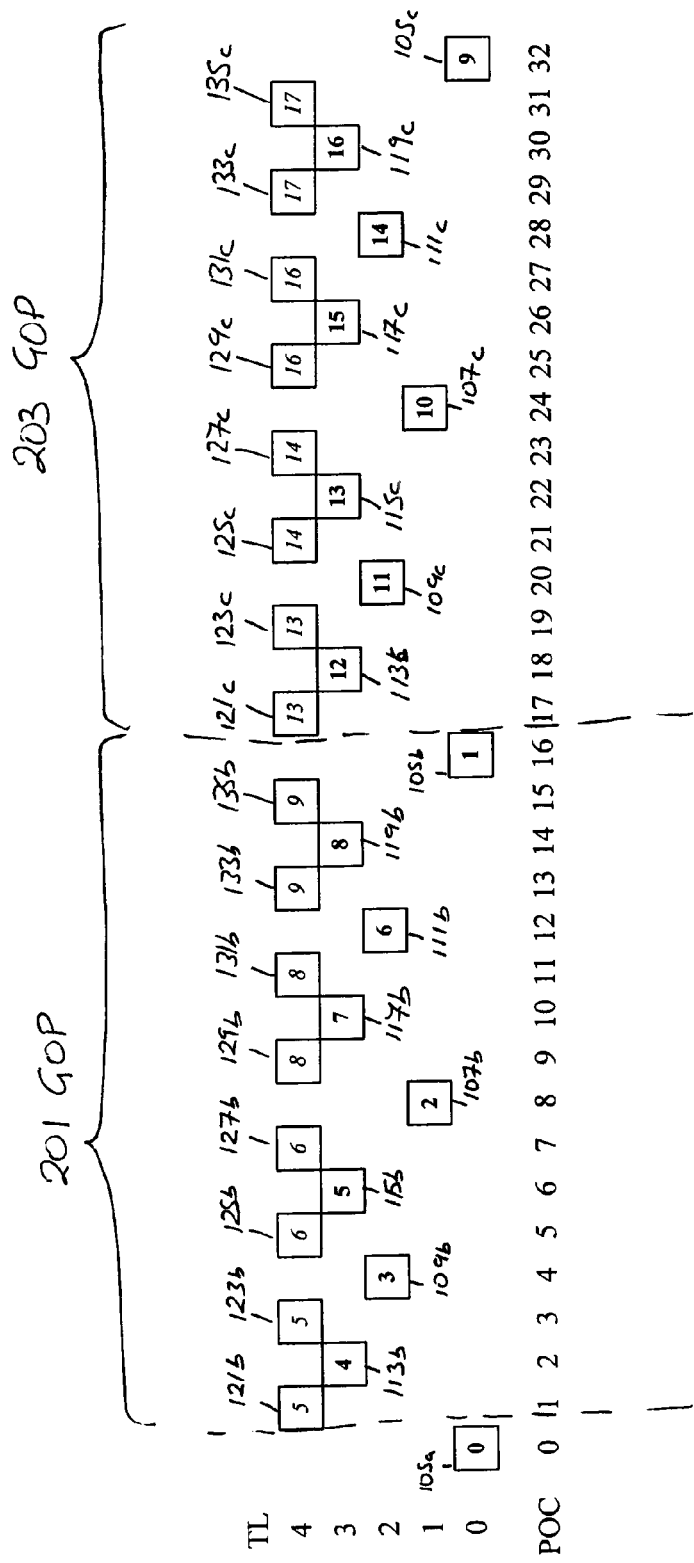
FIG. 2b shows schematically a hierarchical structure of four temporal scalable layers of video pictures as shown in FIG. 2a with an additional temporal layer as employed in embodiments of the present invention.

With respect to FIGS. 2a and 2b, schematic views of typical hierarchical coding structure with levels of temporal scalability are shown to assist in the understanding of the invention.

FIG. 2a shows two complete groups of pictures (GOP). The first complete group of pictures 102 are referenced with b postfixes and the second complete group of pictures 103 are referenced with c postfixes. FIG. 2a further shows a stub of a group of picture which are referenced with a postfixes. The display order of the pictures is reference in FIG. 2a by the picture order count (POC) values. Furthermore each picture is provided with a temporal level (TL) value as is further described below.

Each group of pictures comprises a key picture, the Intra (I) or Predicted (P) picture 105. The I or P pictures are coded as the first picture of a group of pictures (GOPs) in decoding order. When a key picture is inter coded, the previous key pictures are used as reference for inter-picture prediction. These key pictures correspond to the lowest temporal level (denoted as TL=0 in FIG. 2) in the temporal scalable structure and are associated with the lowest frame rate. In the example shown in FIG. 2a each group of pictures further comprises a series of hierarchically structured bi-predicted (B) pictures. Specifically each group of pictures comprises a B picture 107 with a temporal level of 1, two B pictures 109, 111 with a temporal level of 2, and four B pictures 113, 115, 117, 119 with a temporal level of 3. The pictures are arranged in a picture order count order so that within each group of pictures the order of the pictures with respect to the TL value is 3,2,3,1,3,2,3,0.

Pictures of a higher temporal level may only use pictures of the same or lower temporal level for inter-picture prediction.

With such a hierarchical coding structure, different temporal scalability corresponding to different frame rates can be achieved by discarding pictures of a certain temporal level value and beyond. For example in FIG. 2a the pictures with a picture order count value of 0, 105a, 8, 105b, and 16, 105c, are of the lowest temporal level, while the pictures with a picture order count value of 1 113b, 3 115b, 5 117b, 7 119b, 9 113c, 11 115c, 13 117c and 15 119c are of the highest temporal level.

Thus if a frame rate of 30 Hz is achieved where decoding all the temporal levels then other frame rates can be obtained by discarding pictures of some temporal levels. For example using the pictures of the lowest temporal level only a frame rate of 3.25 Hz may be achieved.

With respect to FIG. 2b, the picture coding structure of FIG. 2a is shown with an additional temporal level, the TL=4 level. For each of the groups of pictures 201, 203 there are eight TL=4 B pictures 121,123,125,127,129,131,133,135. A TL=4 level B picture is spaced immediately before and immediately after each TL=3 level B picture. Thus within each group of pictures the order of the pictures with respect to the TL value is shown as 4,3,4,2,4,3,4,1,4,3,4,2,4,3,4,0. FIG. 2b furthermore shows the frame_num value corresponding with the decoded order of the pictures. The italic values correspond to the non-reference pictures, in other words pictures which are not used to provide information to assist decoding other pictures. The addition of the TL=4 layer would if the TL=3 and lower layers permitted a 30 Hz frame rate not permits frame rates of 60 Hz.

Using the structure shown in FIG. 2b, table 1 below indicates which reference picture becomes unneeded for further inter prediction reference after decoding of each picture.

TABLE 1

Analysis of the DPB status for the example in FIG. 2b, when reference pictures are marked as unused for reference as soon as they become no longer needed for inter prediction

| coding number/ frame_num | display number (possible POC) | marked as "used for reference" | Pictures marked as "used for reference" in the DPB after decoding the picture identified by the coding number of the display number |
| --- | --- | --- | --- |
| 0/0 | 0 | yes | 0 |
| 1/1 | 16 | yes | 0, 16 |
| 2/2 | 8 | yes | 0, 16, 8 |
| 3/3 | 4 | yes | 0, 16, 8, 4 |
| 4/4 | 2 | yes | 0, 16, 8, 4, 2 |
| 5/5 | 1 | no | 16, 8, 4, 2 |
| 6/5 | 3 | no | 16, 8, 4 |
| 7/5 | 6 | yes | 16, 8, 4, 6 |
| 8/6 | 5 | no | 16, 8, 6 |
| 9/6 | 7 | no | 16, 8 |
| 10/6 | 12 | yes | 16, 8, 12 |
| 11/7 | 10 | yes | 16, 8, 12, 10 |
| 12/8 | 9 | no | 16, 12, 10 |
| 13/8 | 11 | no | 16, 12 |
| 14/8 | 14 | yes | 16, 12, 14 |
| 15/9 | 13 | no | 16, 14 |
| 16/9 | 15 | no | 16 |
| 17/9 | 32 | yes | 16, 32 |
| 18/10 | 24 | yes | 16, 32, 24 |
| 19/11 | 20 | yes | 16, 32, 24, 20 |
| 20/12 | 18 | yes | 16, 32, 24, 20, 18 |
| 21/13 | 17 | no | 32, 24, 20, 18 |
| 22/13 | 19 | no | 32, 24, 20 |
| 23/13 | 22 | yes | 32, 24, 20, 22 |
| 24/14 | 21 | no | 32, 24, 22 |
| 25/14 | 23 | no | 32, 24 |
| 26/14 | 28 | yes | 32, 24, 28 |
| 27/15 | 26 | yes | 32, 24, 28, 26 |
| 28/16 | 25 | no | 32, 28, 26 |
| 29/16 | 27 | no | 32, 28 |
| 30/16 | 30 | yes | 32, 28, 30 |
| 31/17 | 29 | no | 32, 30 |
| 32/17 | 31 | no | 32 |
| 33/17 | 48 | yes | 32, 48 |
| ... | ... | ... | ... |

(The pictures are represented by their display number. A reference is marked as "unused for reference" as soon as it become no longer needed for inter prediction reference.)

According to table 1, the minimum number of pictures that are needed to be stored in the DPB for inter prediction reference is 5 where there are 5 layers of temporal scalable layers. The peak is achieved after pictures with coding order 4 and 20 are decoded.

The relationship between the number of temporal scalable layers, to the minimum number of pictures stored in the DPB for inter prediction reference in order to decode the signal holds for similar scalable structures. Thus when the number of layers is equal to N, the minimum picture space required to be able to decode the bitstream in total is also N.

However as can be seen in tables 2 and 3 below when one or more high temporal layers are discarded, the minimum number of pictures required to be stored in the DPB for inter prediction reference also decreases. Table 2 shows the DPB status when decoding only the base layer (TL equal to 0). Table 3 shows the situation when decoding the layers up to TL equal to 1 (in other words the TL=0 and TL=1 layers)

TABLE 2

Analysis of DPB status when decoding only the base layer

| coding number/ frame_num | display number (possible POC) | marked as "used for reference" | Pictures marked as "used for reference" in the DPB after decoding the picture identified by the coding number of the display number |
|---|---|---|---|
| 0/0 | 0 | Yes | 0 |
| 1/1 | 16 | Yes | 16 |
| 2/9 | 32 | Yes | 32 |
| 3/17 | 48 | Yes | 48 |

(The pictures are represented by their display number. A reference is marked as "unused for reference" as soon as it become no longer needed for inter prediction reference.)

TABLE 3

Analysis of DPB status when decoding the layer with TL less than or equal to 1

| decoding order/ frame_num | display number (possible POC) | marked as "used for reference" | Pictures marked as "used for reference" in the DPB after decoding the picture identified by the coding number of the display number |
|---|---|---|---|
| 0/0 | 0 | yes | 0 |
| 1/1 | 16 | yes | 0, 16 |
| 2/2 | 8 | yes | 16, 8 |
| 3/9 | 32 | yes | 16, 32 |
| 4/10 | 24 | yes | 32, 24 |
| 5/17 | 48 | yes | 32, 48 |

(The pictures are represented by their display number. A reference is marked as "unused for reference" as soon as it become no longer needed for inter prediction reference.)

As can be seen in Table 3, picture 8 or 24 is no longer required to be stored for inter prediction reference after the picture itself is decoded. However, since reference picture marking in conventional coding occurs before storing the current decoded reference picture, there is currently no way to mark the current decoded reference picture as "unused for reference".

Table 4 shown below further extends this by showing the minimum required numbers of pictures stored in the DPB for inter prediction reference when decoding different temporal layers.

TABLE 4

|  | TL | | | | |
|---|---|---|---|---|---|
|  | 0 | 1 | 2 | 3 | 4 |
| Min DPB size | 1 | 2 | 3 | 4 | 5 |

Thus in general, in temporal scalable coding with hierarchical prediction structure where the number of temporal scalable layers equals to $N_t$, the required minimum number of pictures stored in the DPB for inter prediction reference for decoding a temporal layer with TL greater than or equal to 0 and less than $N_t$ is the TL value plus 1 (in other words TL+1).

Similarly the maximum number of frames reordered for output, specified by num_reorder_frames for the entire bitstream, differs dependent on the number of the layers being decoded. Thus in decoding the low temporal scalable layers fewer reorderings have to be made.

Figure 3A:
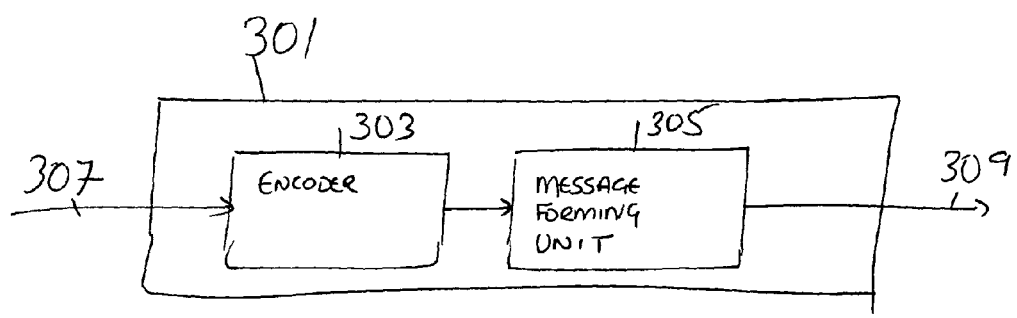
FIG. 3a shows schematically a video encoder according to embodiments of the present invention.
Figure 3B:
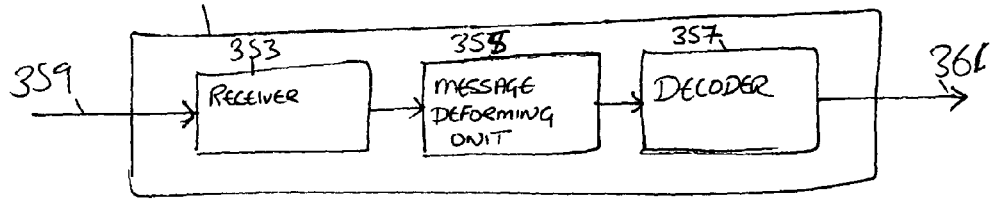
FIG. 3b shows schematically a video decoder according to embodiments of the present invention.

FIGS. 3a and 3b show a first embodiment of the present invention where the above may be implemented to improve the device as shown in FIG. 1. The operation of the embodiments as shown in FIGS. 3a and 3b is further described with respect to FIG. 4.

FIG. 3a shows a schematic view of a video encoder 301 according to a first embodiment of the present invention. The video encoder 301 receives a raw data stream 307 and outputs an encoded data stream with layer information. The video encoder comprises a scalable data encoder 303 which receives the raw data stream 307 and is connected to a message forming unit 305. The message forming unit furthermore outputs the encoded video data 309.

The scalable data encoder 303 receives the raw data stream 307 which is shown in FIG. 4 in step 501.

The scalable data encoder then encodes the data to produce one or more scalable encoded layers. This operation is shown in FIG. 4 in step 503.

The scalable data encoder further deduces the scalability information and passes this information together with the encoded layers to the message forming unit 305. This operation is shown in FIG. 5 in step 505.

The message forming unit inserts this information into the encoded data stream. In the first embodiment, at least one of the proposed indications for each scalable layer is included in the temporal scalable bitstream, e.g. in the sequence parameter set or in a Supplemental Enhancement Information (SEI) message.

The syntax and semantics of a SEI message that signals the indications is as follows:

| . temp_layer_info( payloadSize ) { | C | Descriptor |
|---|---|---|
|    num_temp_layers_minus2 | 5 | ue(v) |
|    for( i = 0; i <= num_layers_minus2; i++ ) { | | |
|       max_dec_frame_buffering[ i ] | 5 | ue(v) |
|       num_reorder_frames[ i ] | 5 | ue(v) |
|    } | | |
| } | | |

The above SEI message may be associated with an instantaneous decoding refresh (IDR) access unit. The information signalled in the SEI message is valid from the access unit containing the SEI message to the next access unit containing an SEI message of the same type, exclusive.

The semantics of the message are:
num_temp_layers_minus2 plus 2 specifies the number of temporal scalable layers contained in the coded video sequence.

max_dec_frame_buffering[i] has the same semantics as the syntax element max_dec_frame_buffering in H.264/AVC with the only difference being that the bitstream in question herein is the one containing the temporal scalable layer with temporal level equal to i and all the lower temporal layers. num_reorder_frames[i] has the same semantics as the syntax element num_reorder_frames in H.264/AVC with the only difference being that the bitstream in question herein is the one containing the temporal scalable layer with temporal level equal to i and all the lower temporal layers.

This operation is shown in FIG. 4 in step 506.

The output encoded data stream is then transmitted/stored as shown in FIG. 4 in step 507.

FIG. 3b shows a schematic view of a video decoder 351 according to the first embodiment of the present invention. The video decoder receives encoded video data 359 and outputs decoder video data 361. The decoder comprises a receiver 353 configured to receive the encoded data and outputs a signal to the message deforming unit 355. The message deforming unit 355 is further connected to the decoder 357. The decoder is further configured to output the decoded video data 361.

The receiver 353 of the decoder 351 receives the encoded video data 359. The reception or retrieval of this data is shown in FIG. 4 in step 509.

The message deforming unit 355 receives the received video data from the receiver 353 and extracts the indication information from the SEI message shown above in the data stream. The message deforming unit may in some embodiments of the invention be an access unit decomposer. This indication information is passed to the decoder 357. This operation is shown in FIG. 4 in step 510.

The decoder 357 is configured dependent on the indication information from the message deforming unit 355. This configuration may include the configuration of the size of the decoder picture buffer (DPB) in terms of the size of buffer required for storing reference frames and the output reordering buffer size. This operation is shown in FIG. 4 in step 511.

The decoder 357, once configured, is configured to decode the video data. This operation is shown in FIG. 4 in step 513.

The decoder 357 is then further configured to output the decoded video data. This operation is shown in FIG. 4 in step 515.

The advantages of implementing the embodiments of the invention can be explained by the following example. A streaming server may contain a temporal scalable bitstream, for which the required decoded picture buffer (DPB) size is equal to N1 frames. The temporal scalable bitstream contains a lower temporal layer for which the required DPB size is equal to N2 frames, where N2<N1. The profile and level of the entire bitstream are the same as the lower temporal layer bitstream. A streaming client is able to decode the lower temporal layer but unable to decode the entire bitstream due to insufficient memory available. After the client requests the video content from the server, the server informs the required DPB size, among others, to the client.

Without the invention, the streaming server would inform the client that the required DPB size is N1 for either the entire bitstream or the lower layer bitstream. Consequently, the client knows that it is not able to decode anything from the server, and the request fails. By implementation of the invention the server can easily determine the actually required DPB size for the lower temporal layers from the proposed signalling and informs the client, such that the requested streaming session can start and the client can successfully receive and decode the lower temporal layer(s), and may not require to reserve memory and resource which are not required in order to decode the lower temporal layer(s).

The client can further utilize the proposed signalling of the maximum number of frames reordered for output according to the invention to start output and display decoded pictures as soon as possible, thus to reduce the initial playback delay.

In a second embodiment of the invention, the same indication information as above may be included in the scalability information SEI message as specified in the draft SVC standard and not in a separate SEI message such as defined above. The indication information is thus passed to the receiver along with other scalability information for each temporal level as signalled in the scalability information SEI message. In such embodiments of the invention the message deforming unit is configured to extract the indication information from fields within the scalability information SEI message.

In a further embodiment of the invention SEI messages are not used to transfer the scalable indication information. In these further embodiments of the invention the scalable indication information is included in a container file where the temporal scalable bitstream is stored. In such embodiments the fields max_dec_frame_buffering and num_reorder_frames are included in the TierinfoBox as defined in the latest draft SVC file format standard, which is available in MPEG output document N8874, January 2007, Marrakech, Morocco.

In such embodiments the message forming unit 305 and message deforming unit 355 use the container file to store the indication information and extract the information from respectively.

In a further embodiment of the invention the information may be signalled outside of the encoded data bit stream. For example in some embodiments of the invention the scalable indication information is sent or stored as part of a session initiation protocol (SIP) session description protocol (SDP) attribute, which may be communicated from the encoder (server) to the decoder (client). This communication may be carried out by using real-time streaming protocol (RTSP) or session initiation protocol (SIP).

Although the hierarchical B picture coding structure described above is the most typical coding structure for temporal scalability, it should be noted that other coding structures are possible and used in other embodiments of the invention. The number of GOP size and the structuring of the pictures within the GOP may differ from embodiment to embodiment. Furthermore the GOP size in other embodiments of the invention may not be constant over time. In other embodiments the temporal enhancement layer pictures in other embodiments of the invention may not be coded as B slices, but may also be coded as P slices.

Although the above examples describe embodiments of the invention operating within a codec within an electronic device 610, it would be appreciated that the invention as described below may be implemented as part of any scalable video codec.

Thus user equipment may comprise a video codec such as those described in embodiments of the invention above.

It shall be appreciated that the term user equipment is intended to cover any suitable type of user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims.

However, all such and similar modifications of the teachings of this invention will still fall within the scope of this invention as defined in the appended claims.

The invention claimed is:

1. An encoding apparatus comprising at least a processor, a memory having computer program code instructions stored therein, said instructions when executed by a processor causing the apparatus to perform:
   generating an encoded scalable data stream having a plurality of temporal scalable layers comprising a base layer and at least one enhancement layer, wherein the apparatus is further configured to generate information associated with each of the base layer and the at least one enhancement layer in a Supplemental Enhancement Information message, the information comprising:
   a minimum picture buffer size associated with each of the base layer and the at least one enhancement layer, wherein the minimum picture buffer size is dependent on the number of scalable temporal layers of the base layer and the at least one enhancement layer; and
   a maximum picture reordering size associated with each of the base layer and the at least one enhancement layer, wherein the maximum picture buffer reordering size is dependent on the number of scalable temporal layers of the base layer and the at least one enhancement layer.

2. An apparatus as claimed in claim 1, further comprising instructions causing the apparatus to perform:
   generating the encoded scalable data stream; and generating the information associated with each of the base layer and the at least one enhancement layer and storing the information in a message.

3. The apparatus as claimed in claim 2, further comprising instructions causing the apparatus to perform:
   combining the message within the encoded scalable data stream; and
   generating the Supplemental Enhancement Information message.

4. The apparatus as claimed in claim 3, wherein the Supplemental Enhancement Information message further comprises an indication of the number of temporal scalable layers contained in the encoded scalable data stream.

5. The apparatus as claimed in claim 2, wherein the message former is configured to generate a container file, wherein the container file comprises the information associated with each of the base layer and the at least one enhancement layer in a message.

6. The apparatus as claimed in claim 1, wherein the apparatus is configured to generate a signaling protocol packet comprising the information associated with each of the base layer and the at least one enhancement layer.

7. The apparatus as claimed in claim 6, wherein the packet is a session description protocol packet, and the information associated with each of the base layer and the at least one enhancement layer are session description protocol packet attributes.

8. A method comprising:
   generating, using a processor, an encoded scalable data stream having a plurality of temporal scalable layers comprising a base layer and at least one enhancement layer;
   generating information associated with each of the base layer and the at least one enhancement layer, and
   including the information associated with each of the base layer and the at least one enhancement layer in a Supplemental Enhancement Information message, the information comprising:
   a minimum picture buffer size associated with each of the base layer and the at least one enhancement layer, wherein the minimum picture buffer size is dependent on the number of scalable temporal layers of the base layer and the at least one enhancement layer; and
   a maximum picture reordering size associated with each of the base layer and the at least one enhancement layer, wherein the maximum picture buffer reordering size is dependent on the number of scalable temporal layers of the base layer and the at least one enhancement layer.

9. The method as claimed in claim 8, further comprising storing the information associated with each of the base layer and the at least one enhancement layer in a message.

10. The method as claimed in claim 9, further comprising: combining the message within the encoded scalable data stream; and generating the Supplemental Enhancement Information message.

11. The method as claimed in claim 10, comprising storing an indication of the number of temporal scalable layers contained in the encoded scalable data stream in the Supplemental Enhancement Information message.

12. The method as claimed in claim 9, comprising generating a container file, wherein the container file comprises the information associated with each of the base layer and the at least one enhancement layer in a message.

13. The method as claimed in claim 8, comprising generating a signaling protocol packet comprising the information associated with each of the base layer and the at least one enhancement layer.

14. The method as claimed in claim 13, wherein generating the signaling protocol packet comprises generating a session description protocol packet, and generating session description protocol packet attributes comprising the information associated with each of the base layer and the at least one enhancement layer.

15. An apparatus comprising at least a processor, and a memory having computer program code instructions stored therein, said instructions when executed by a processor causing the apparatus to perform:
receiving an encoded scalable data stream having a plurality of temporal scalable layers comprising a base layer and at least one enhancement layer signal, and outputting a decoded video signal;
receiving information associated with each of the base layer and the at least one enhancement layer, wherein the apparatus is further configured to generate decoded video data from the scalable data stream and is further configured to configure the apparatus dependent on extracted information associated with each of the base layer and the at least one enhancement layer; and
decoding the encoded scalable data stream dependent on the configuration, wherein the apparatus is further configured to extract the information associated with each of the base layer and the at least one enhancement layer from a Supplemental Enhancement Information message in the encoded data stream, wherein the information comprises a minimum picture buffer size associated with each of the base layer and the at least one enhancement layer, wherein the minimum picture buffer size is dependent on the number of sacalaablee of the base layer and the at least one enhancement layer and a maximum picture reordering size associated with each of the base layer and the at least one enhancement layer, wherein the maximum picture buffer reordering size is dependent on the number of scalable temporal layers of the base layer and the at least one enhancement layer.

16. The apparatus as claimed in claim 15, wherein the apparatus is further configured to:
filter the Supplemental Enhancement Information message from the encoded scalable data stream.

17. The apparatus as claimed in claim 16, wherein the apparatus is further configured to extract an indication of the number of temporal scalable layers contained in the encoded scalable data stream from the Supplemental Enhancement Information message.

18. The apparatus as claimed in claim 15, further configured to extract the information associated with each of the base layer and the at least one enhancement layer from a signaling protocol packet.

19. An apparatus as claimed in claim 18, further configured to extract the information associated with each of the base layer and the at least one enhancement layer from a session description protocol packet, wherein the information associated with each of the base layer and the at least one enhancement layer are session description protocol packet attributes.

20. A method comprising:
receiving an encoded scalable data stream having a plurality of temporal scalable layers comprising a base layer and at least one enhancement layer signal;
receiving information associated with each of the base layer and the at least one enhancement layer, the information comprising a minimum picture buffer size associated with each of the base layer and the at least one enhancement layer, wherein the value of the minimum picture buffer size is based at least in part on the number of temporal scalable layers;
configuring a decoder dependent on the information associated with each of the base layer and the at least one enhancement layer;
decoding the encoded scalable data stream dependent on the configuration of the decoder; and
causing output of a decoded video signal, said method further comprising:
extracting the information associated with each of the base layer and the at least one enhancement layer from a Supplemental Enhancement Information message in the encoded data stream, wherein the information comprises a minimum picture buffer size associated with each of the base layer and the at least one enhancement layer, wherein the minimum picture buffer size is dependent on of the base layer and the at least one enhancement layer and a maximum picture reordering size associated with each of the base layer and the at least one enhancement layer, wherein the maximum picture buffer reordering size is dependent on the number of scalable temporal layersof the base layer and the at least one enhancement layer.

21. The method as claimed in claim 20, further comprising:
filtering the information message from the encoded scalable data stream.

22. The method as claimed in claim 21, wherein extracting further comprises extracting an indication of the number of temporal scalable layers contained in the encoded scalable data stream from the Supplemental Enhancement Information message.

23. A method as claimed in claim 20, wherein extracting further comprises extracting the information associated with each of the base layer and the at least one enhancement layer from a signaling protocol packet.

24. The method as claimed in claim 23, wherein extracting further comprises extracting the information associated with each of the base layer and the at least one enhancement layer from a session description protocol packet, wherein the information associated with each of the base layer and the at least one enhancement layer are session description protocol packet attributes.

25. A computer program product in which a software code is stored in a non-transitory computer readable medium, wherein said code realizes the following when being executed by a processor:
generating an encoded scalable data stream having a plurality of temporal scalable layers comprising a base layer and at least one enhancement layer; and
generating information associated with each of the base layer and the at least one enhancement layer including the information associated with each of the base layer and the at least one enhancement layer in a Supplemental Enhancement Information message, wherein the information comprises a minimum picture buffer size associated with each of the base layer and the at least one enhancement layer, wherein the minimum picture buffer size is dependent on the number of scalable temporal layers of the base layer and the at least one enhancement layer and a maximum picture reordering size associated with each of the base layer and the at least one enhancement layer, wherein the maximum picture buffer reordering size is dependent on the number of scalable temporal layers of the base layer and the at least one enhancement layer.

26. A computer program product in which a software code is stored in a non-transitory computer readable medium, wherein said code realizes the following when being executed by a processor:

receiving an encoded scalable data stream having a plurality of temporal scalable layers comprising a base layer and at least one enhancement layer signal;

receiving information associated with each of the base layer and the at least one enhancement layer;

configuring a decoder dependent on extracted information associated with the base layer and the at least one enhancement layer;

decoding the encoded scalable data stream dependent on the configuration of the decoder; and causing output of a decoded video signal, said code further configured to:

extract the information associated with each of the base layer and the at least one enhancement layer from a Supplemental Enhancement Information message in the encoded data stream, wherein the information comprises a minimum picture buffer size associated with each of the base layer and the at least one enhancement layer, wherein the minimum picture buffer size is dependent on the number of scalable temporal layers of the base layer and the at least one enhancement layer and a maximum picture reordering size associated with each of the base layer and the at least one enhancement layer, wherein the maximum picture buffer reordering size is dependent on the number of scalable temporal layers of the base layer and the at least one enhancement layer.

* * * * *

UNITED STATES PATENT AND TRADEMARK OFFICE
CERTIFICATE OF CORRECTION

Page 1 of 1

PATENT NO. : 8,938,012 B2
APPLICATION NO. : 12/595765
DATED : January 20, 2015
INVENTOR(S) : Wang et al.

It is certified that error appears in the above-identified patent and that said Letters Patent is hereby corrected as shown below:

In the claims:

Column 17, claim 15
Line 48, "sacalaablee" should read --scalable temporal layers--.

Column 18, claim 21
Line 32, "on of" should read --on the number of scalable temporal layers of--;
Line 37, "layersof" should read --layers of--.

Signed and Sealed this
Eighth Day of September, 2015

Michelle K. Lee
*Director of the United States Patent and Trademark Office*